(12) United States Patent
Jeffers et al.

(10) Patent No.: US 7,355,726 B2
(45) Date of Patent: Apr. 8, 2008

(54) LINEAR VARIABLE REFLECTOR SENSOR AND SIGNAL PROCESSOR

(75) Inventors: Larry A. Jeffers, Minerva, OH (US); John W. Berthold, Salem, OH (US)

(73) Assignee: Davidson Instruments Inc.

( * ) Notice: Subject to any disclaimer, the term of this patent is extended or adjusted under 35 U.S.C. 154(b) by 184 days.

(21) Appl. No.: 11/105,671

(22) Filed: Apr. 14, 2005

(65) Prior Publication Data

US 2005/0231736 A1 Oct. 20, 2005

Related U.S. Application Data

(60) Provisional application No. 60/562,651, filed on Apr. 15, 2004.

(51) Int. Cl.
*G01B 11/14* (2006.01)
(52) U.S. Cl. .................................. 356/614; 356/445
(58) Field of Classification Search ............... 356/416, 356/630, 631, 632, 482, 498
See application file for complete search history.

(56) References Cited

U.S. PATENT DOCUMENTS

| | | | |
|---|---|---|---|
| 4,210,029 A | | 7/1980 | Porter |
| 4,358,960 A | * | 11/1982 | Porter ........................ 73/705 |
| 4,529,875 A | * | 7/1985 | Brogardh et al. ...... 250/227.23 |
| 4,777,358 A | | 10/1988 | Nelson |
| 4,787,741 A | | 11/1988 | Udd et al. |
| 4,806,016 A | * | 2/1989 | Corpron et al. ............. 356/620 |
| 5,118,191 A | * | 6/1992 | Hopkins ...................... 356/368 |
| 5,218,418 A | | 6/1993 | Layton |
| 5,361,130 A | | 11/1994 | Kersey et al. |
| 5,647,030 A | | 7/1997 | Jorgenson et al. |
| 5,835,645 A | | 11/1998 | Jorgenson et al. |
| 5,986,749 A | | 11/1999 | Wu et al. |
| 6,069,686 A | | 5/2000 | Wang et al. |
| 6,122,415 A | | 9/2000 | Blake |
| 6,256,100 B1 | * | 7/2001 | Banet et al. ................. 356/432 |
| 6,304,686 B1 | | 10/2001 | Yamate et al. |
| 6,492,800 B1 | | 12/2002 | Woods et al. |
| 6,496,265 B1 | * | 12/2002 | Duncan et al. ............. 356/479 |
| 6,552,799 B1 | | 4/2003 | Wright et al. |
| 6,621,258 B2 | | 9/2003 | Davidson et al. |
| 6,636,321 B2 | | 10/2003 | Bohnert |
| 6,704,101 B1 | * | 3/2004 | Rangarajan et al. ...... 356/237.2 |
| 2004/0075841 A1 | | 4/2004 | Van Neste et al. |
| 2004/0246493 A1 | * | 12/2004 | Kim et al. ................... 356/504 |

* cited by examiner

*Primary Examiner*—Tarifur Chowdhury
*Assistant Examiner*—Tara S. Pajoohi
(74) *Attorney, Agent, or Firm*—McDonald Hopkins LLC; Risto Pribisich; Robert H. Earp, III

(57) ABSTRACT

Linear variable reflector sensors can be used to measure the displacement of objects. These sensors are useful in that they can be very small, do not conduct electricity, and are resistant to electrical interference from EMI/EMP and lightning strikes. The present linear variable reflector system comprises a light source, a light transmitting member in optical communication with the light source, a sensor in optical communication with the light transmitting member. The sensor comprises a moveable transparent body, a reflective material deposited on the transparent body, and at least one film deposited over said reflective material, wherein said reflective material reflects light. Further, the linear variable reflector system comprises a detector coupled to the sensor to detect displacement of the moveable transparent body.

22 Claims, 6 Drawing Sheets

LINEAR VARIABLE REFLECTOR SENSOR AND SIGNAL PROCESSOR

CROSS-REFERENCE TO RELATED APPLICATIONS

This application claims priority from U.S. Provisional Patent Application No. 60/562,651 filed on Apr. 15, 2004, which is hereby incorporated by reference.

FIELD OF INVENTION

The present invention relates generally to linear variable reflector sensors, and more particularly, to linear variable reflector systems containing a linear variable reflector sensor to measure displacement of an object.

BACKGROUND

Many aerospace applications use linear and rotary displacement measurements. These include such things as throttle lever position and flap position on aircraft. The sensor presently used to measure such linear and rotary displacement is the linear variable differential transformer (LVDT). These sorts of devices require electrical power and wiring to transmit the signal. As a result, LVDT based readouts are subject to electromagnetic pulses and electromagnetic interference. Although LVDT sensors are relatively lightweight transformers, reducing the weight will reduce costs and offer other advantages.

SUMMARY OF THE INVENTION

In accordance with the present invention there is provided a linear variable reflector system that comprises a light source, a light transmitting member in optical communication with the light source, and a sensor in optical communication with the light transmitting member. Further, the sensor comprises a moveable transparent body, which may be made from glass, plastic or other transparent material with low inherent reflectance. A reflective material is deposited on the transparent moveable body, and at least one film is deposited over said reflective material, wherein said reflective material reflects light. Finally, the linear variable reflector system comprises a detector coupled to the sensor to detect displacement of the moveable transparent body.

In another embodiment of the present invention a method of measuring displacement is disclosed. The method comprises emitting a light from a light source, transmitting the light through a light transmitting member, providing a sensor having a moveable transparent body with a reflective material deposited thereon, the reflective material being of variable thickness across said transparent body, and a plurality of films deposited over said reflective material, reflecting the light using the sensor, detecting said reflected light with a detector, and sending a signal to a microprocessor indicative of displacement of said transparent body.

DESCRIPTION OF THE DRAWINGS

Objects and advantages together with the operation of the invention may be better understood by reference to the following detailed description taken in connection with the following illustrations, wherein.

DETAILED DESCRIPTION

Figure 3:
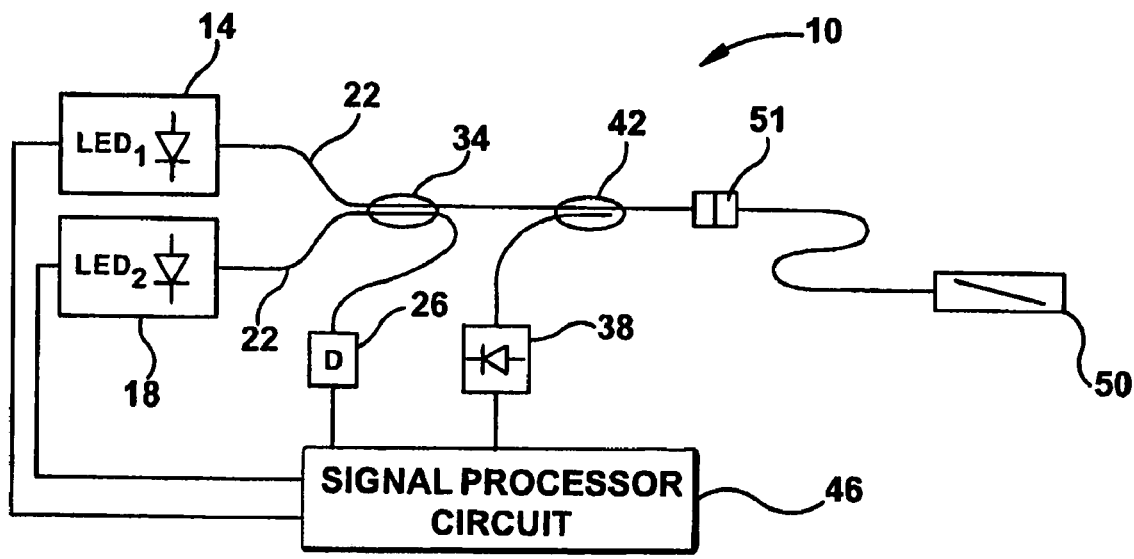
FIG. 3 is a schematic of a linear variable reflector system of an embodiment of the present invention.

A linear variable reflector system of an embodiment of the present invention is shown in FIG. 3. The linear variable reflector system 10 comprises a light source such as a first light emitting diode (LED) 14 and a second light source such as a second LED 18 shown in FIG. 3. The present invention is not limited to two light sources, any number of light sources may work, including, without limitation, one, three, four, etc. Further, the linear variable reflector system comprises a light transmitting member such as optical fibers 22 that are in optical communication with the first and second LED 14, 18. A first photodiode detector or power monitor detector 26 is coupled to the optical fibers 22 through a first coupler 34. A second photodiode detector 38 is coupled to the optical fibers 22 through a second coupler 42. A signal processor 46 is coupled to the first and second photodiode detectors 26, 38. Finally, a sensor 50 is in optical communication with the optical fibers 22 through a connector 51.

The first and second LED 14 and 18 of the present embodiment emit light at 940 nm and 640 nm respectively. It should be understood, however, that light sources emitting light at different wavelengths can also be used, including light emitting diodes that emit light at different wavelengths than 940 nm and 640 nm disclosed herein. The 940 nm and 640 nm wavelength LEDs were specifically mentioned herein because they are commercially available.

The light emitted from the first and second LED 14 and 18 is transmitted through the optical fibers 22 through the 2×2 coupler 34 and through the second 2×1 coupler 42 to the sensor 50, which reflects the light. More specifically, the sensor 50 includes a linear variable reflector (LVR) 54, shown in FIGS. 1 and 1A, that reflects the light. Further, as shown in FIG. 3, one of the 2×2 coupler 34 output leads is connected to the first photodiode detector 26 to monitor the output power of the first and second LED 14 and 18. The light reflected from the LVR 54 is transmitted back through the same transmission fiber 22 to the second photodiode detector 38. The detectors 26 and 38 may be silicon, which is sensitive at the two LED wavelengths. Finally, the signal processor 46, which includes a microprocessor shown in FIG. 4 is used to process the light signals received by the two detectors 26 and 38.

During operation of the linear variable reflector system 10, the first and second LED 14 and 18 are alternately turned on and off so that the detector outputs are alternating from the first LED 14 and then to the second LED 18. The signals from the power monitor detector 26 are processed by the signal processor 46 to correct the system output for long term changes and to notify a user if an LED burns out or drifts out of an allowable range. This includes compensating for changes in light coupling at the couplers 34, 42 and transmission losses of the optical fibers 22.

Figure 4:
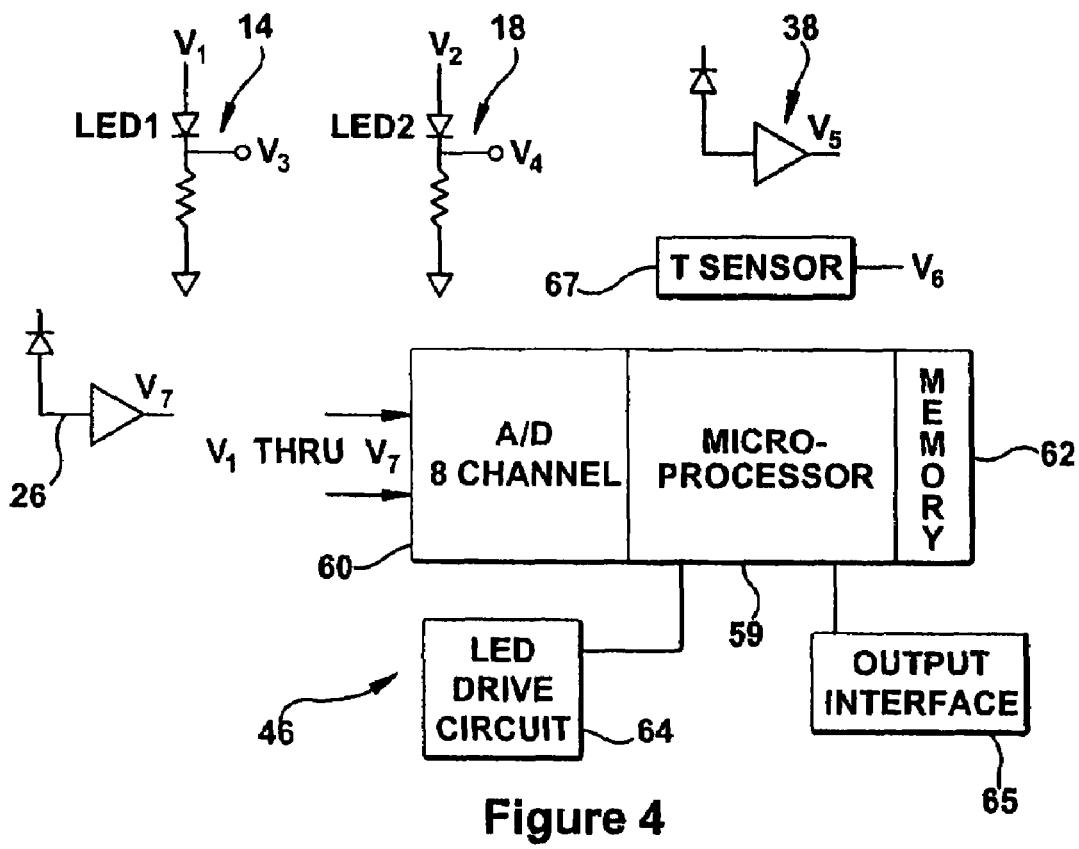
FIG. 4 is a schematic of the components of a signal processor of an embodiment of the present invention.

Further, functional blocks of the signal processor circuit of the linear variable system 10 are shown in FIG. 4. The circuit is built around a microprocessor 59. The microprocessor 59 includes 8 channels of analog-to-digital conversion (A/D) 60. The microprocessor 59 controls the LED drive circuit 64 and synchronizes it with the A/D sampling of the seven indicated voltages. Measurement by the microprocessor 59 of the first four voltages permits monitoring of both the current and voltage across the first and second LED 14 and 18. The current measurement allows the microprocessor 59 to drive the first and second LED 14 and 18 to maintain a constant current. Further, the signal processor circuit includes memory 62 so as to record measurements taken, corrective action taken, and other such operational characteristics that arise. The signal processor circuit also includes a temperature sensor 67 to record temperatures in the system. Finally, the signal processor circuit includes an output interface 65. This allows the signal processor circuit to communicate with the various other elements and with a separate computer that may be attached with the system (not shown).

When the first and second LED 14 and 18 have constant current flowing therethrough the first and second LED light output will remain constant except for the following: (i) a slight drop with increasing temperature; or (ii) a very slow, steady decrease with time that reduces the output to one-half of the original value in about 100,000 hours.

The light output drop with temperature is accompanied by an increase in the voltage drop across the diode. This relationship between voltage drop and temperature is linear and can be used by the signal processor 46 to compensate for any light level changes due to temperature. The drop in light output with time is likewise associated with an increase in the voltage drop across the diode. The signal processor 46 can accordingly compensate for age variations of output as well as variations due to temperature.

Alternatively, the output voltage V7 from the power monitor detector 26 measures output from the first and second LED 14 and 18 directly. These signals can be used to compensate for changes in LED output that result from factors other than time and temperature, such as changes in splitter losses and changes in fiber cable losses.

The temperature sensor 67 shown in FIG. 4 is used to monitor the temperature of the signal processor components. The signal processor 46 can provide corrections for sensitivity changes of the detectors 26 and 38 due to temperature, and correct for emission wavelength shift of the first and second LED 14 and 18 with temperature. The signal processor output can be digital, a linear voltage, or current output proportional to the position of LVR 54 (see FIGS. 2 and 3).

Figure 1:
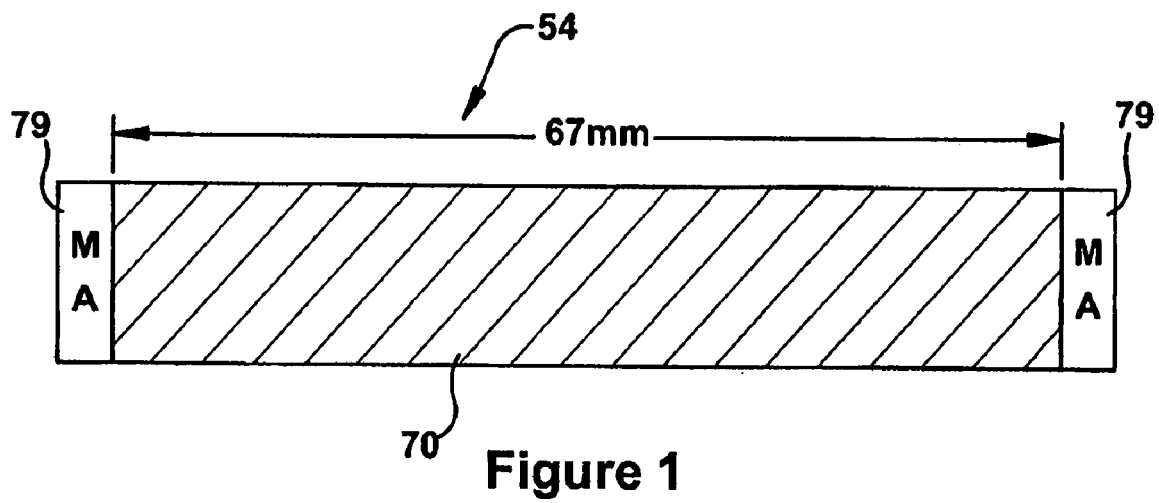
FIG. 1 is a diagrammatic view of a linear variable reflector of an embodiment of the present invention.
Figure 1A:
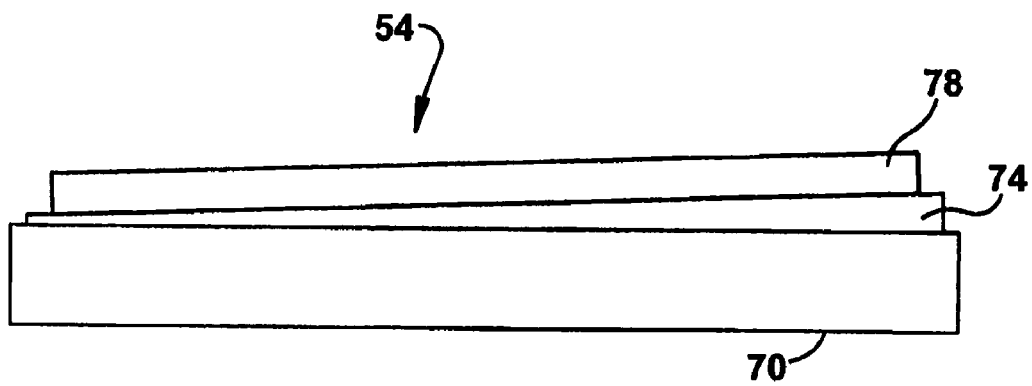
FIG. 1a is a diagrammatic side view of the linear variable reflector of an embodiment of the present invention.

The LVR 54 of an embodiment of the present invention is shown in FIGS. 1 and 1A. The LVR 54 is based on a dichroic, moving reflector. The LVR 54 includes a transparent body 70 such as a rectangular glass plate that is moveable and an optical fiber that does not move. In one embodiment, the transparent body is made of glass with thickness between about 1 to 1.5 mm and is mechanically coupled to an external mechanism to measure the displacement or position of the mechanism (e.g., throttle lever). It should be understood, however, that the transparent body can be made from plastic or other transparent material with low inherent reflectance, not just glass. A reflective material 74 such as gold is deposited on the transparent body 70. The deposited reflective material 74 is non-uniform across the transparent body 70 so that the reflectance changes approximately linearly from one end of the plate 70 to the other. In other words, the reflective material 74 is of variable thickness across the transparent body 70, including where the thickness of such is different at every point across the transparent body, where the reflective material 74 goes from its thinnest at one end of the transparent body 70 to its thickest at an opposite end, like a wedge. The reflective material 74 is over-coated with a dielectric stack of a plurality of thin films 78 that reflect light over the visible and near infrared portions of the spectrum. Finally, as shown in FIG. 1, the LVR 54 includes a mounting area 79 so as to properly mount the LVR 54.

Figure 2:
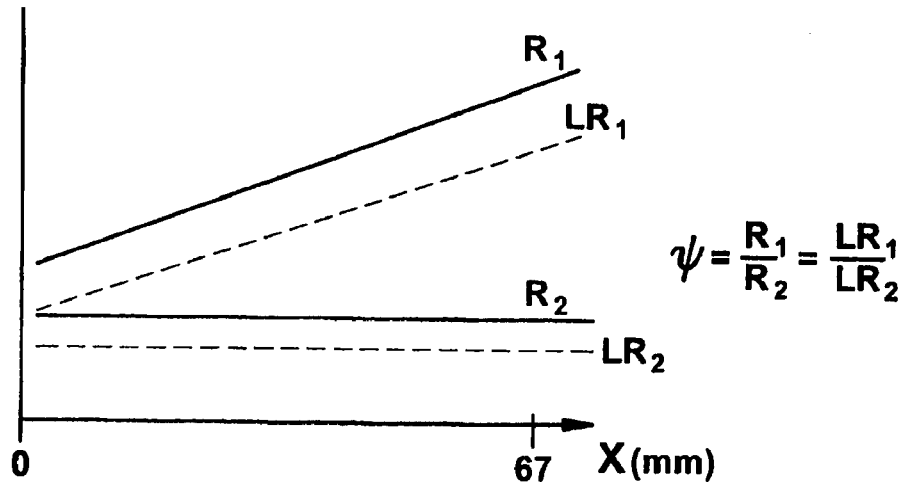
FIG. 2 is a graphical representation of a basis of a two color position sensor using the linear variable reflector of an embodiment of the present invention.

Shown in FIG. 2 is an embodiment wherein two colors are used to read the LVR 54 position. The graph shown in FIG. 2 plots reflectance versus position along the LVR 54 at two wavelengths $\lambda_1$ and $\lambda_2$. It is well known in the art that the reflectance of gold at a given thickness is greater in the near infrared than in the visible portion of the spectrum. So in this embodiment the reflectance R1 is plotted for an LED with wavelength $\lambda_1 = 940$ nm and R2 is plotted for an LED with wavelength $\lambda_2 = 640$ nm. In the embodiment shown in FIG. 1, the coated area of the LVR 54 is 67 mm long.

If the optical system light loss is the same at wavelengths $\lambda_1$ and $\lambda_2$, then the ratio of the resultant signals $\psi$ at any give position does not change. In reality, neither R1 nor R2 behave as in the idealized case shown in FIG. 2. The approach to deal with the actual reflectance changes is discussed below.

Figure 5:
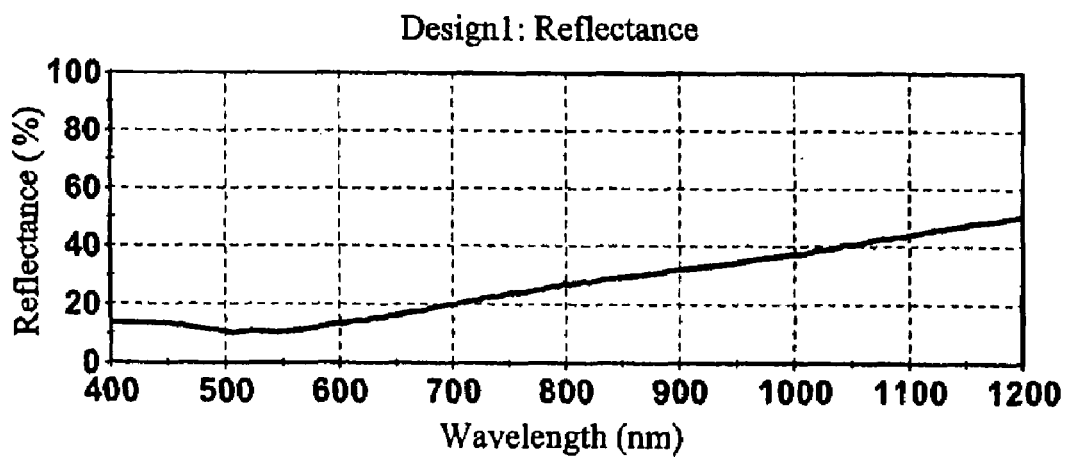
FIG. 5 is a graphical representation of reflectance versus wavelength for a 7.5 nm thick gold film on a transparent body.
Figure 6:
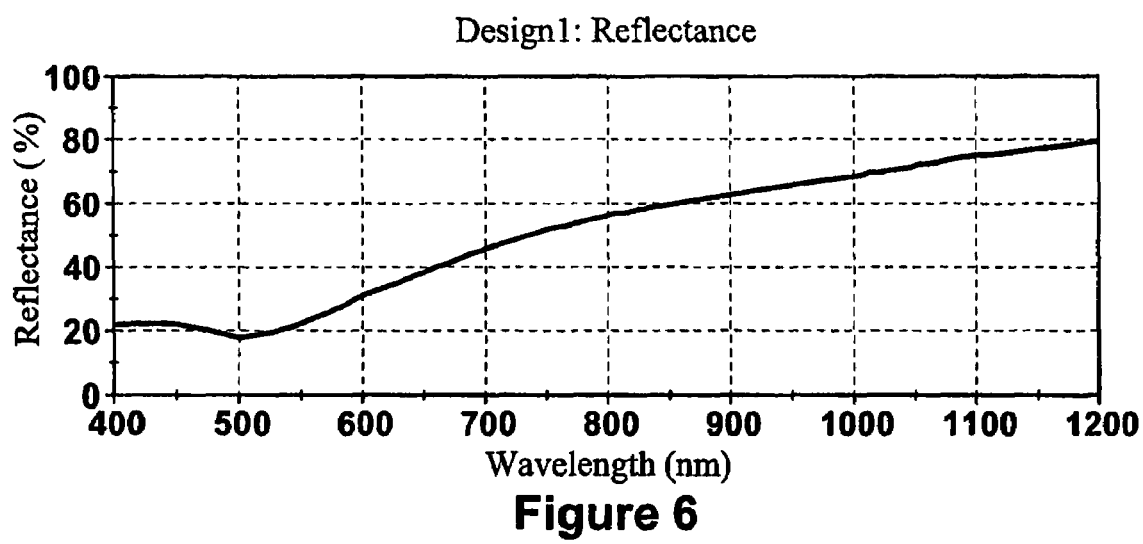
FIG. 6 is a graphical representation of reflectance versus wavelength for 15 nm thick gold film on a transparent body.
Figure 7:
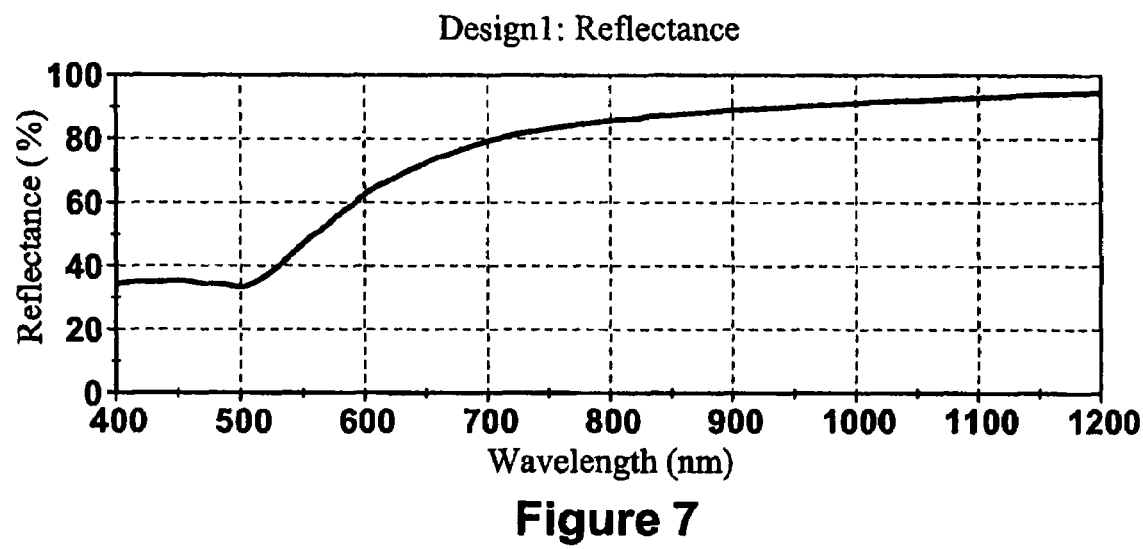
FIG. 7 is a graphical representation of reflectance versus wavelength for 30 nm thick gold film on a transparent body.

As previously stated, deposited on the transparent body 70 is a reflective material, such as gold, with non-uniform thickness and a dielectric stack of a plurality of thin films 78 that reflect light over the visible and near infrared portions of the spectrum. The reflectance of thin gold layers on glass is shown in FIGS. 5 through 7. More specifically, plotted in FIGS. 5, 6, and 7 is the reflectance of different thickness of gold deposited on glass. The wavelength spectrum (400 nm to 1200 nm) of the plots covers the visible and near infrared. As can be seen in comparing the three plots: (i) from 400 nm to 500 nm the reflectance is approximately constant with wavelength; (ii) from 500 nm to 700 nm the reflectance is a nonlinearly increasing function with wavelength; and (iii) from 700 nm to 1200 nm the reflectance increases approximately linearly with wavelength.

The pertinent information to the present invention is the change in reflectance with gold thickness at the two LED wavelengths 640 nm and 940 nm. As previously stated, these wavelengths are chosen because LED's with high output power are commercially available. It should be understood, however, that other wavelengths could be used as well. It is important to note that for a thickness change from 7.5 nm to 30 nm of gold, the change in the gold reflectance is roughly (70%/18%)~4 at 640 nm and (90%/30%)~3 at 940 nm. That is, the change in reflectance with gold thickness is not much different at the two wavelengths. Since it is necessary to ratio the signals at the two LED wavelengths to remove sensitivity to changes other than reflectance (see above), the value of the ratio 4/3=1.25 is not very sensitive to the reflectivity change either. To enhance the sensitivity to reflectivity changes the thin film reflector stack 78 shown in FIG. 1*a* is used.

The thin film reflector stack 78 involves multiple layers, preferably between 8 and 14 layers. The layers contain both low-reflective and high-reflective substances, such as zinc sulfide, magnesium fluoride and/or oxides of titanium, silicon, zirconium, hafnium and/or tantalum, and an additional gold base. The thicknesses of each layer varies between 10 nm and 500 nm and, excepting the gold layer, refractive indices between 1.3000 and 2.5000. A glass substrate is also included. Those skilled in the art will appreciate and be able to determine the precise configuration in terms of thicknesses, refractive indices and number of layers, and customization of the design formula is anticipated based upon the precise application and operating conditions.

Figure 8:
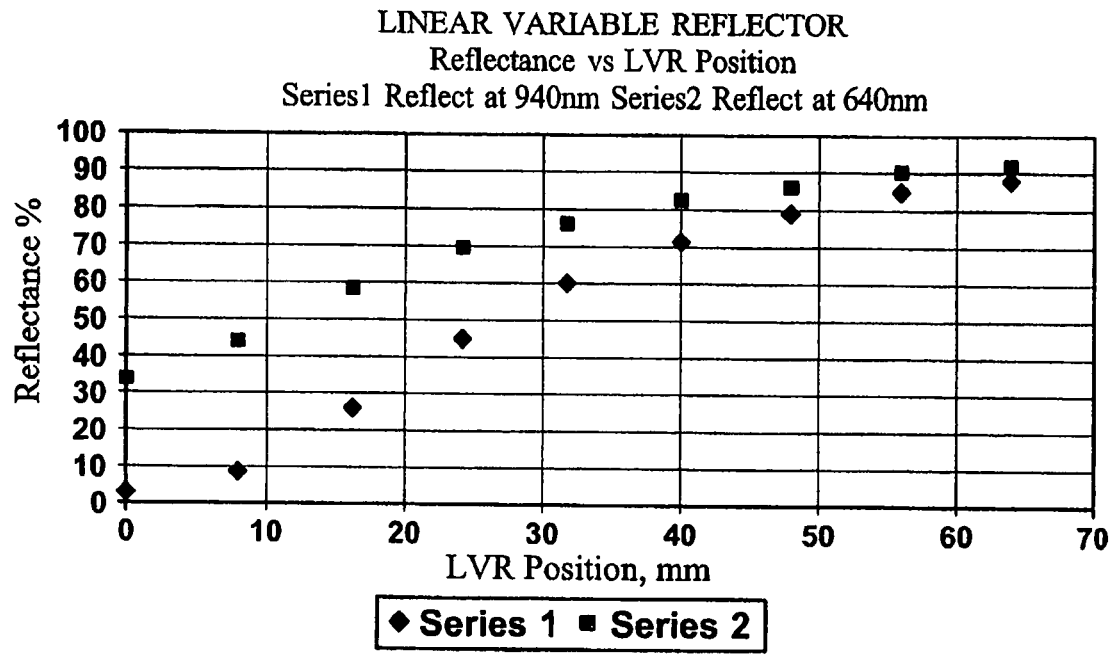
FIG. 8 is a graphical representation of reflectance versus linear variable reflector position for the light emitting diode source wavelengths.

All layers except for the gold are to be deposited with uniform thickness over the entire transparent substrate. As previously stated, the gold layer has variable, decreasing thickness along the length of the glass substrate in the range from 40 nm to 1 nm. The reflectance versus wavelength can be readily calculated. Shown in FIG. 8 are reflectance values for different gold thicknesses with the thickness of the other twelve dielectric layers in the formula held constant. Or, more specifically, shown in FIG. 8 are the results of calculations of reflectance versus wavelength at the different gold thicknesses (the dielectric layer thicknesses are held constant). The reflectance at 640 nm and 940 nm is obtained independently from graphical plots of reflectance versus wavelength and the specific reflectance values at the LED wavelengths are plotted in FIG. 8, which is reflectance versus position of the LVR at each of the two wavelengths. Since the gold layer was deposited with thickness increasing from one end of the substrate to the other, each LVR position has associated with it a unique gold thickness. Thus, FIG. 8 is a plot of reflectance versus thickness as well as position.

Figure 9:
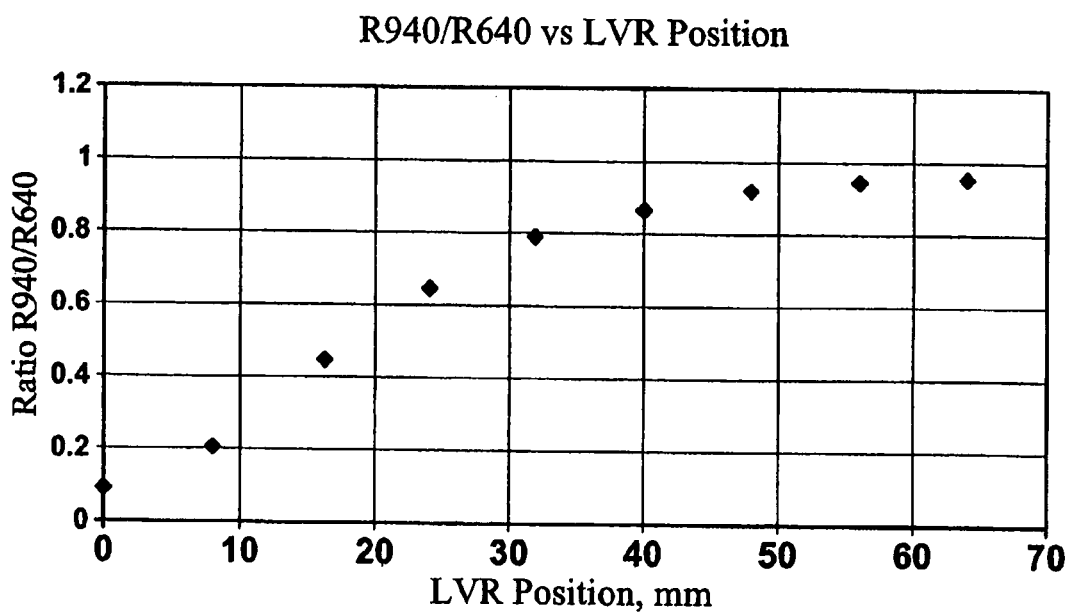
FIG. 9 is a graphical representation of the ratio of light emitting diode signals versus linear variable reflector position.

The ratio of the data plotted in FIG. 8 is plotted in FIG. 9. Note that there is significant nonlinearity in this plot. The curve is S-shaped from 0 to 40 mm position and then flattens out from 40 nm to 65 mm.

Figure 10:
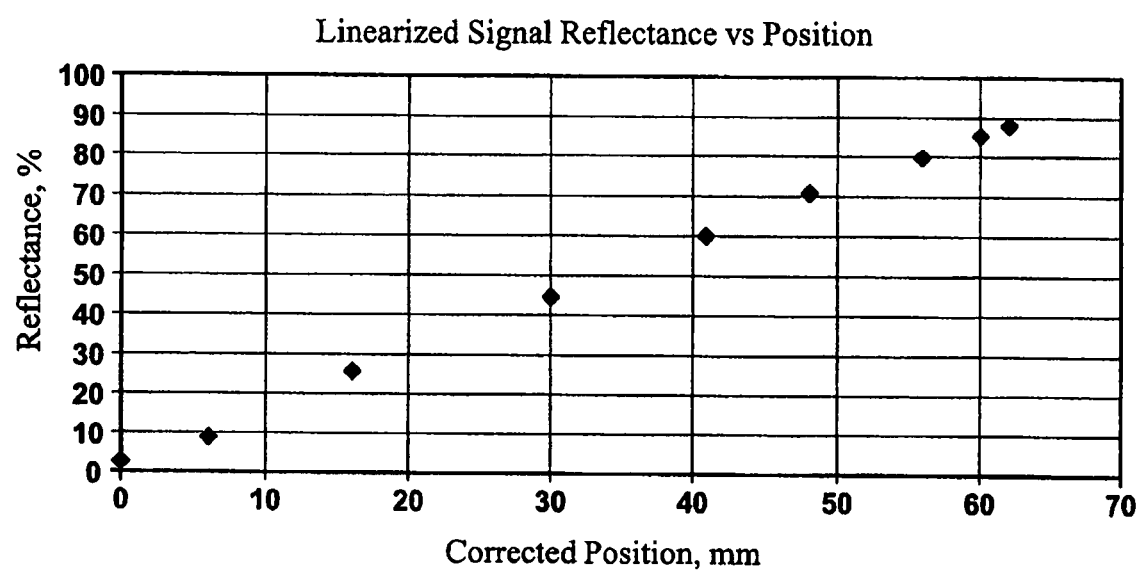
FIG. 10 is a graphical representation of reflectance of the linear variable reflector versus position after adjustment to gold thickness versus position.

It is straightforward to eliminate these nonlinearities by depositing the gold on the substrate in such a way that the thickness of the gold is a nonlinear function of position along the substrate. The result is shown in FIG. 10. As in FIGS. 8 and 9, the reflective layers include the gold layer and the twelve dielectric layers with uniform thickness.

Some residual nonlinearity remains, but a least squares analysis to a linear fit shows that the standard error is 1.3%. Therefore, the LVR coating of an embodiment of the present invention can be used to produce analog position sensors with a position accuracy better than 1.5% of the displacement range.

The embodiment produces an LVR that can be used with a fiber optic cable and signal processor. The LVR can be used to measure rotary and linear position instead of a linear variable differential transformer. The LVR is resistant to electrical interference from EMI/EMP and lightning strikes. The glass optical fiber that connects the LVR with the signal processor is not an electrical conductor so there is no interference or noise pickup on the transmission line. Further, the LVR has low weight. The LVR is a small rectangle of transparent material such as glass or plastic that is much lower weight than an LVDT. In addition, the LVR system has fewer components than an equivalent LVDT system. Additionally, the LVR has a small physical size compared to a typical LVDT system. Minimum size simplifies the deployment of the LVR for both linear and variable displacement measurement.

Finally, the use of a microprocessor signal conditioner enables compensation for manufacturing variations in the wavelength dependence of the optical coatings on the LVR transparent bodies and unit-to-unit variations in the emission wavelengths of the LED's. Each LVR system can be calibrated during manufacturing to account for variations in the composite wavelength dependencies of the components.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A linear variable reflector system comprising:
   a first light source;
   a light transmitting member in optical communication with said first light source;
   a sensor in optical communication with said light transmitting member, said sensor comprising:
   a moveable transparent body;
   a reflective material deposited on said transparent body; said reflective material having variable thickness across said transparent body; and
   at least one film deposited over said reflective material, wherein said reflective material reflects light; and
   a detector coupled to said sensor to detect displacement of said moveable transparent body.

2. The linear variable reflector system of claim 1, further comprising a signal processor coupled to said detector.

3. The linear variable reflector system of claim 2, wherein said film comprises a plurality of dielectric stacks of films.

4. The linear variable reflector system of claim 3, wherein said signal processor compensates for light level changes due to temperature variations.

5. The linear variable reflector system of claim 4, wherein said signal processor compensates for age variations of output from said light source.

6. The linear variable reflector system of claim 5, wherein said signal processor compensates for changes of said detector due to temperature variations and from emission wavelength shifts of said first light source with temperature.

7. The linear variable reflector system of claim 1, further comprising a second light source having a wavelength different from said first light source.

8. The linear variable reflector system of claim 7, wherein a ratio of light reflected by said sensor from said first light source and said second light source is used to generate signals to said signal processor indicative of displacement of said moveable transparent body.

9. The linear variable reflector system of claim 8, wherein said first light source is a light emitting diode and said second light source is a second light emitting diode.

10. The linear variable reflector system of claim 1, wherein said light transmitting member is an optical fiber.

11. The linear variable reflector system of claim 1, wherein said reflector material is of variable thicknesses across said transparent body.

12. The linear variable reflector system of claim 11, wherein said reflector material is of different thicknesses at every point across said transparent body.

13. A linear variable reflector system comprising:
    a first light source;

a light transmitting member in optical communication with said first light source;

a sensor in optical communication with said light transmitting member, said sensor comprising:
  a moveable transparent body;
  a reflective material deposited on said transparent body, said reflective material having variable thickness across said transparent body; and
  a plurality of films deposited over said reflective material, wherein said reflective material reflects light;

a detector coupled to said sensor to detect displacement of said moveable transparent body; and a signal processor coupled to said detector.

14. The linear variable reflector system of claim 13, further comprising a second detector that measures output from said first light source.

15. The linear variable reflector system of claim 14, wherein voltage measured across said first light source is used to compensate for aging and temperature of said first light source.

16. The linear variable reflector system of claim 15, wherein said second detector provides a signal to compensate for changes in light coupling and fiber transmission losses.

17. The linear variable reflector system of claim 13, further comprising a second light source having a wavelength different from said first light source.

18. The linear variable reflector system of claim 17, wherein a ratio of light reflected by said sensor from said first light source and said second light source is used to generate signals to said signal processor indicative of displacement of said moveable transparent body.

19. The linear variable reflector system of claim 13, wherein said variable thickness of said reflective material is of a different thickness at every point along said transparent body.

20. The linear variable reflector system of claim 13, wherein said variable thickness of said reflective material is substantially a wedge shape across said transparent body.

21. A method of measuring displacement comprising:
  emitting a light from a first light source;
  transmitting said light through a light transmitting member;
  providing a sensor having a moveable transparent body with a reflective material deposited thereon, the reflective material being of variable thickness across said transparent body, and a plurality of films deposited over said reflective material;
  reflecting said light using said sensor;
  detecting said reflected light with a detector; and
  sending a signal to a signal processor indicative of displacement of said moveable transparent body.

22. The method of claim 21, further comprising emitting a light from a second light source having a wavelength different from said first light source, and taking a ratio of light reflected by said sensor from said first light source and said second light source to generate said signal indicative of displacement of said moveable transparent body.

* * * * *

UNITED STATES PATENT AND TRADEMARK OFFICE
CERTIFICATE OF CORRECTION

PATENT NO. : 7,355,726 B2
APPLICATION NO. : 11/105671
DATED : April 8, 2008
INVENTOR(S) : Larry A. Jeffers and John W. Berthold It is certified that error appears in the above-identified patent and that said Letters Patent is hereby corrected as shown below:

Col. 6 Line 41, "from said light source" should read -- from said first light source --.

Signed and Sealed this

Sixteenth Day of September, 2008

JON W. DUDAS
*Director of the United States Patent and Trademark Office*